United States Patent [19]

Atlas

[11] Patent Number: 5,012,170

[45] Date of Patent: Apr. 30, 1991

[54] MECHANICAL STABILIZATION SYSTEM WITH COUNTER-ROTATING NESTED ROTORS

[75] Inventor: Gérard Atlas, Mercey, France

[73] Assignee: Societe Europeenne de Propulsion, Suresnes, France

[21] Appl. No.: 470,826

[22] Filed: Jan. 26, 1990

[30] Foreign Application Priority Data

Jan. 31, 1989 [FR] France .................... 89 01216

[51] Int. Cl.$^5$ .................................. B64G 1/38
[52] U.S. Cl. ............................ 318/611; 343/766; 343/759; 318/49; 318/46
[58] Field of Search ............... 318/611, 138, 254, 439, 318/632, 640, 646; 310/112, 114, 115, 116, 118, 126, 127; 343/757–763, 766, DIG. 2

[56] References Cited

U.S. PATENT DOCUMENTS

| | | | |
|---|---|---|---|
| 2,966,811 | 1/1961 | Sundt | 343/766 X |
| 3,514,778 | 5/1970 | Titus | 343/766 X |
| 4,158,845 | 6/1979 | Pinson | 343/759 |
| 4,181,283 | 1/1980 | Rizzo | 343/759 X |
| 4,227,347 | 10/1980 | Tam | 318/40 X |
| 4,373,147 | 2/1983 | Carlson, Jr. | 318/49 X |
| 4,375,047 | 2/1983 | Nelson et al. | 318/49 X |
| 4,392,137 | 7/1983 | Intlekofer et al. | 343/766 X |
| 4,465,951 | 8/1984 | Dalby | 310/114 |
| 4,571,528 | 2/1986 | McGee et al. | 318/254 X |
| 4,755,700 | 7/1988 | Yongning et al. | 318/49 X |
| 4,755,825 | 7/1988 | Crochet et al. | 343/757 |
| 4,761,588 | 8/1988 | Youcet-Toumi et al. | 318/46 |
| 4,772,892 | 9/1988 | Payelian et al. | 343/766 X |

FOREIGN PATENT DOCUMENTS 0130541 9/1985 European Pat. Off. .
WO86/00863 2/1986 PCT Int'l Appl. .
WO87/00654 1/1987 PCT Int'l Appl. .
WO88/10459 12/1988 PCT Int'l Appl. .

OTHER PUBLICATIONS

"A Reactionless Precision Pointing Actuator", Peter Wiktor, pp. 165–174, May 1, 1987, Houston, Aerospace Mechanism Symposium, NASA Conference Publication 2.
"Design and Development of a High Efficiency Effector for the Control of Attitude and Power in Space Systems", Stephen O'Dea et al., pp. 353–360, vol. 2, Aug. 1, 1985, Proceedings of the 20th Intersociety Energy Conversion Engineering Conf.

Primary Examiner—Paul Ip
Attorney, Agent, or Firm—Weingarten, Schurgin, Gagnebin & Hayes

[57] ABSTRACT

The mechanical stabilization system for a support comprises a working rotor mounted on the support by means of bearings and fixed to a working member having at least one parameter associated with the rotation of the working member and which is variable as a function of time. A reaction rotor is concentric with the working rotor and is mounted on the working rotor by means of bearings and is fixed to a reaction inertia member. A first servo-controlled electric motor is interposed between the working rotor and the reaction rotor and serves to drive the working rotor and the reaction rotor in opposite directions of rotation. A low power second electric motor is interposed between the working rotor and the support and is servo-controlled in such a manner as to reposition the reaction rotor and correct for drift in the correcting motion of the reaction rotor, due in particular to friction in the bearings.

11 Claims, 5 Drawing Sheets

MECHANICAL STABILIZATION SYSTEM WITH COUNTER-ROTATING NESTED ROTORS

The present invention relates to a mechanical stabilization system with counter-rotating nested rotors, the system comprising a support to be stabilized, a working rotor mounted on the support by means of bearings and fixed to a working member for which at least one parameter associated with the rotation of the working rotor is variable as a function of time, a reaction rotor concentric with the working rotor, mounted on the working rotor by means of bearings and fixed to a reaction inertia member, a first electric motor interposed between the working rotor and the reaction rotor and rotating the working rotor and the reaction rotor in opposite directions, and a second electric motor interposed between the working rotor.

BACKGROUND OF THE INVENTION

Rotary systems having at least one parameter such as position, speed, torque, or acceleration which is servo-controlled as a function of time, tend to disturb the support on which they are mounted by a reaction effect. Such disturbances can generally be considered as being negligible when the support has considerable mass, e.g. a large ship. In contrast, the disturbances become significant and require compensating when the mass of the support is relatively small or when the position of the support must be maintained very accurately. This applies in particular to satellites which are required to conserve a well-defined attitude in orbit or which are subjected to the constraints of microgravity: the systems embarked on the satellite such as systems for rotating an antenna or solar panels at a non-constant speed tend to disturb the stability of the satellite unacceptably in the absence of stabilization systems.

In a paper entitled "A Reactionless Precision Pointing Actuator" given by Peter Wiktor at the "Aerospace Mechanism Symposium" held in Houston in May 1987, proposals are made to provide a control system for a gyroscopic platform which simultaneously ensures stabilization so as to prevent a reaction torque appearing on the platform support which is constituted by a spacecraft or satellite. In order to ensure decoupling between the motion of the gyroscopic platform and the attitude control of the spacecraft, counter-rotating motion is imparted to a reaction wheel incorporated in the gyroscopic platform and provided with a shaft which is coaxial with the shaft of the gyroscopic platform and which is rotated in the opposite direction thereto by means of an electric motor for the reaction wheel, having its stator mounted on the gyroscopic platform and its rotor fixed to said coaxial shaft. A direct drive second motor has its stator fixed to the support and its rotor fixed to the axis of the gyroscopic platform and serves both to drive the gyroscopic platform so as to cause it to take up an angular position or a speed of rotation as a function of a predetermined law, and also to compensate for interfering torque due to friction in the bearings or to the presence of electricity power cables which prevent angular rotations through more than $2\pi$ radians. The servo-control circuit associated with the electric motor for the reaction wheel has a passband situated in a higher range of frequencies than the passband of the servo-control circuits associated with the direct drive motor.

The embodiment described in the above-mentioned paper uses two electric motors of non-negligible power, thereby increasing both mass and energy consumption, and in addition it is not suitable for applications in which the working rotary member is required to rotate through several turns.

The present invention seeks to remedy the above-mention drawbacks and to provide a mechanical stabilization system which is more convenient to implement, more accurate, more compact, and which enlarges the range of possible applications.

SUMMARY OF THE INVENTION

These aims are achieved by a mechanical stabilization system with counter-rotating nested rotors, the system comprising a support to be stabilized, a working rotor mounted on the support by means of bearings and fixed to a working member for which at least one parameter associated with the rotation of the working rotor is variable as a function of time, a reaction rotor concentric with the working rotor, mounted on the working rotor by means of bearings and fixed to a reaction inertia member, a first electric motor interposed between the working rotor and the reaction rotor and rotating the working rotor and the reaction rotor in opposite directions, and a second electric motor interposed between the working rotor and the support, wherein the system further comprises a detector interposed between the working rotor and the support in order to measure said parameter associated with the rotation of the working rotator and on which a predetermined law of motion as a function of time is imposed, a first servo-control circuit receiving signals from the first detector in order to modify the operating characteristics of the first motor so as to cause said predetermined law of motion to be complied with, a second detector interposed between the reaction rotor and the support, a second servo-control circuit synchronous with the first servo-control circuit and receiving signals from the second detector in order to servo-control the low power second motor in order to reposition the reaction rotor and correct drift arising in the correcting motion of the reaction rotor in particular due to friction in the bearings, and the working rotor is adapted for its amplitude of rotation about its mean position to be greater than several rotations.

By using a main first electric motor acting both on the working rotor and on the reaction rotor in order to confer a law of motion which is a predetermined function of time to the working rotor on the basis of a detector and a first servo-control circuit, and by using a smaller second electric motor acting only as a repositioning motor for compensating friction in the bearings, it is possible to use the reaction rotor both to cancel reaction torque that may appear on the support and to maintain high control accuracy on the motion of the working member by compensating interferring forces due, in particular, to friction in the bearings. It is thus possible to optimize and increase control accuracy over the motion of the working member while reducing the overall mass by using a repositioning motor of relatively small power and size, thereby increasing the range of applications to working rotors that may be required to rotate through angles of rotation that are greater than several turns.

The invention is particularly applicable to a system in which the mean speed of rotation of the working rotor is zero, and the amplitude of rotation of the working rotor has a limited value θU on either side of its mean position, wherein the moment of inertia JA of the reaction rotor is determined as a function of said limited value θU for the amplitude of rotation of the working rotor, of the moment of inertia JU of the working rotor, and of the predetermined motion law imposed on the working rotor, in order to maintain the amplitude of rotation of the reaction rotor to a limited value θA equal to several rotations, the first drive motor common to the working rotor and to the reaction rotor includes winding-free pole pieces fixed to the working rotor and wound pole pieces fixed to the reaction rotor, and the wound pole pieces are powered by a spiral-wound coil of wires enabling the reaction rotor to rotate through an amplitude greater than said limit value θA for the amplitude of rotation of the reaction rotor.

The invention is also applicable to a system in which the amplitude of rotation of the working rotor remains within a range of values limited to several rotations, wherein the first drive motor common to the working rotor and to the reaction rotor includes winding-free pole pieces fixed to the reaction rotor and wound pole pieces fixed to the working rotor, and the wound pole pieces are powered by a spiral-wound coil of wires enabling the working rotor to rotate through an amplitude greater than said limited value θU for the amplitude of rotation of the working rotor.

The system is also applicable where the amplitude of rotation of the working rotor or of the reaction rotor is not limited, wherein the first drive motor common to the working rotor and the reaction rotor is powered by a rotary transformer or by a rotary current collector disposed between the working rotor and the support.

In order to optimize control of a working rotor having a non-zero mean velocity while still ensuring support stability, the system of the invention may further comprise a second reaction rotor rotating in the opposite direction to the working rotor, a third motor being interposed between the support and the second reactor rotor in order to drive the second reaction rotor, and a third servo-control circuit synchronous with the first and second servo-control circuits in order to control the third motor on the basis of a third detector disposed between the second reaction rotor and the support so as to rotate the second reaction rotor at a speed and an inertia such that its angular momentum JB is equal in magnitude and opposite in sign to the angular momentum of the working rotor rotating at its mean speed of rotation, such that the first reaction rotor is required to compensate residual variations only in the angular momentum of the working rotor.

In a variant embodiment, the third servo-control circuit controls the third electric motor in such a manner that the second reaction rotor compensates not only the angular momentum associated with the mean speed of rotation of the working rotor but also variations in the angular momentum thereof associated with large excursions in speed of rotation of the working rotor on either side of its mean value, e.g. excursions related to starting up rotation of the working rotor or to transient conditions that could give rise to major disturbances on the support, thereby enabling the first reaction rotor to compensate small residual variations only in the angular momentum of the working rotor.

The system may be particularly compact if the second reaction rotor is concentric with the working rotor and with the first reaction rotor.

Advantageously, the reaction inertia member representing the major portion of the inertia of the reaction rotor is constituted by working elements providing technical functions, e.g. said electronic servo-control circuits.

The invention may be applied to various rotary assemblies mounted on support structures on land, at sea, in the air, underwater, and in space, with or without gravity forces being present.

In a particularly advantageous application, the support is constituted by a satellite or a space station, and the working member mounted on the working rotor is constituted by a rotary member such as an antenna or a solar panel.

BRIEF DESCRIPTION OF THE DRAWINGS

Embodiments of the invention are described by way of example with reference to the accompanying drawings, in which.

DETAILED DESCRIPTION

Figure 1:
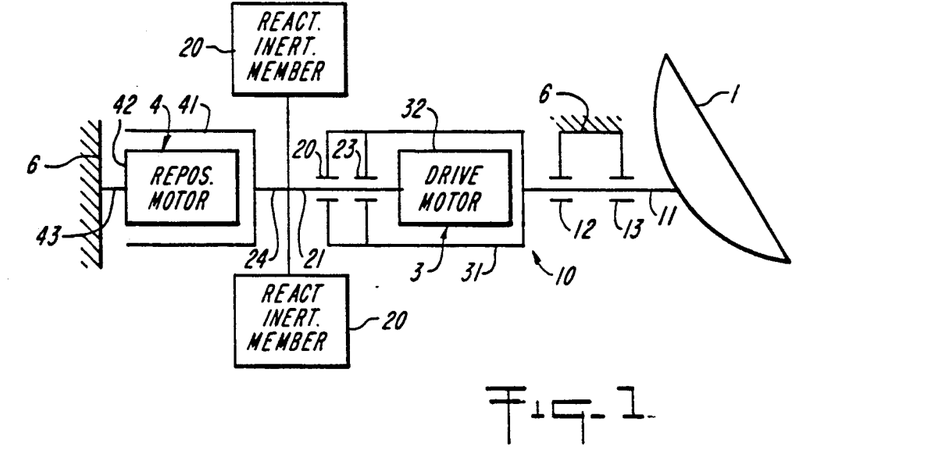
FIG. 1 is a diagram of a first embodiment of a mechanical stabilization system with counter-rotating nested rotors having a main electric motor acting on both rotors and a repositioning electric motor acting on the reaction rotor.

FIG. 1 is a diagram showing a rotary assembly comprising a working rotor 10 having a shaft 11 fixed thereto extending the axis of the working rotor 10 to a working member 1 such as an antenna, for example, whose angular position or some other parameter related to rotation of the working rotor 10, e.g. torque, acceleration, or speed, is to be permanently adjusted in compliance with a predetermined law without transmitting disturbances to a support 6 on which the working rotor 10 is mounted, e.g. by means of the shaft 11 and bearings 12 and 13, e.g. ball bearings.

In order to enable the motion of the working rotor 10 to be controlled without disturbing the support 6 which may be constituted by a satellite of relatively low mass, for example, a reaction rotor 21 attached to a reaction inertia member is mounted on the working rotor 10 via bearings 22 and 23 which may be of the ball bearing type, and is subjected to motion which is actively controlled in the opposite direction to the motion of the working rotor 10, with the controlled motion being such that the support 6 is not subjected to disturbance generated by the various moving members, i.e. the variations in overall angular momentum sensed by the support are zero.

In accordance with the present invention, a main electric motor 3 servo-controlled by electronic servo-control circuits (not shown in the figures) is interposed between the working rotor 10 and the reaction rotor 21 and contributes both to imparting rotary motion to the working rotor 10 and the working member 1 controlled to comply with predetermined variable motion parameters that vary as a function of time, and to rotating the reaction rotor 21 and consequently the reaction inertia member 20 in the opposite direction, with the working rotor 10 and the reaction rotor 21 being driven relative to the support at speeds in opposite directions and at a ratio such that the angular momentum acquired by each of these rotors 10, 21 is the same (in the absence of friction), since the total angular momentum must remain zero.

A detector 33 (shown only in FIGS. 5 to 7) is interposed between the working rotor 10 and the support 6. This detector measures the parameter (e.g.: speed, or torque, or acceleration) associated with the motion of the working rotor 10 and whose variation is to comply with a predetermined law as a function of time. The value of this parameter as sensed by the detector 33 is transmitted to the servo-control circuits which modify the operating characteristics of the motor 3 appropriately to cause the predetermined law of motion for the working rotor 10 to be complied with. Whatever this law may be, the rotation of the reaction rotor 21 prevents disturbances being transmitted to the support 6.

Where necessary, depending on the type of servo-control used, a differential detector 8 (shown in FIGS. 5 to 7) may be interposed between the working rotor 10 and the reaction rotor 21 in order to monitor the relative motion of these two concentric rotors 10 and 21 on a permanent basis, said rotors being nested one inside the other.

In order to increase accuracy when the bearings 12, 13 and 22, 23 are frictionless bearings such as air bearings or magnetic bearings, or in order to correct drift imparted to the correcting motion of the reactor rotor 21 by friction in the bearings 22, 23 for said rotor when the bearings are constituted by ball bearings, for example, an anti-drift or repositioning system is added to the items described above.

The repositioning system comprises a detector 44 (shown only in FIGS. 5 to 7) and a small electric motor 4 interposed between the reaction rotor 21, 24 and a portion 43 of the support 6 (FIGS. 1 and 5), together with a servo-control circuit operating synchronously with the servo-control circuits of the main motor 3, thereby enabling the small repositioning motor 4 to be controlled on the basis of the detector 44.

By having a small repositioning motor 4 acting on the reaction rotor 21, it is possible to guarantee very high accuracy for the system stabilizing the support 6 without greatly increasing the mass of the system and even when the bearings 22, 23 and 12, 13 are constituted merely by conventional ball bearings. On its own, the main motor 3 is capable of providing the main functions of actively controlling the motion of the working member 1 and of actively controlling the counter-rotation of the reaction rotor 21 in such a manner that in the absence of friction in the bearings 22 and 23 it would completely eliminate disturbances on the support 6 by maintaining a total angular momentum of value zero.

Figure 2:
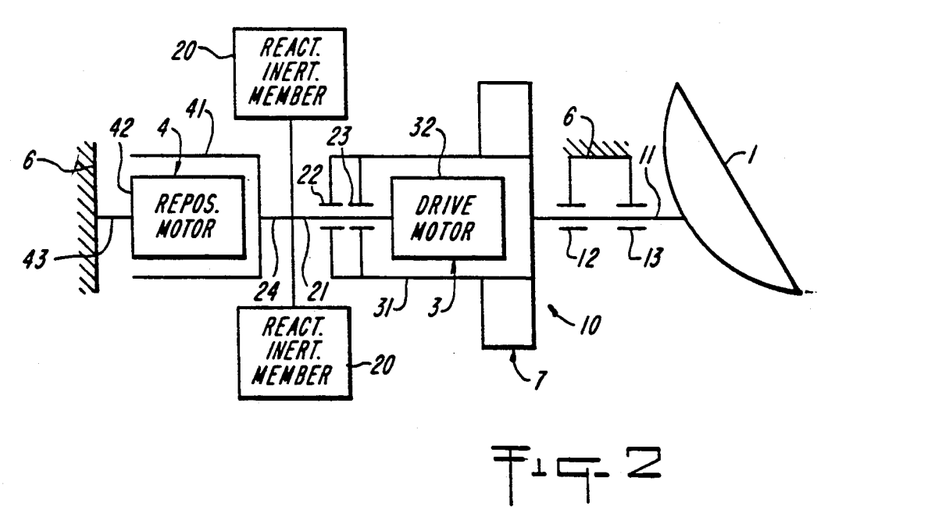
FIG. 2 is similar to FIG. 1, showing the main electric motor being powered via a rotary transformer.
Figure 7:
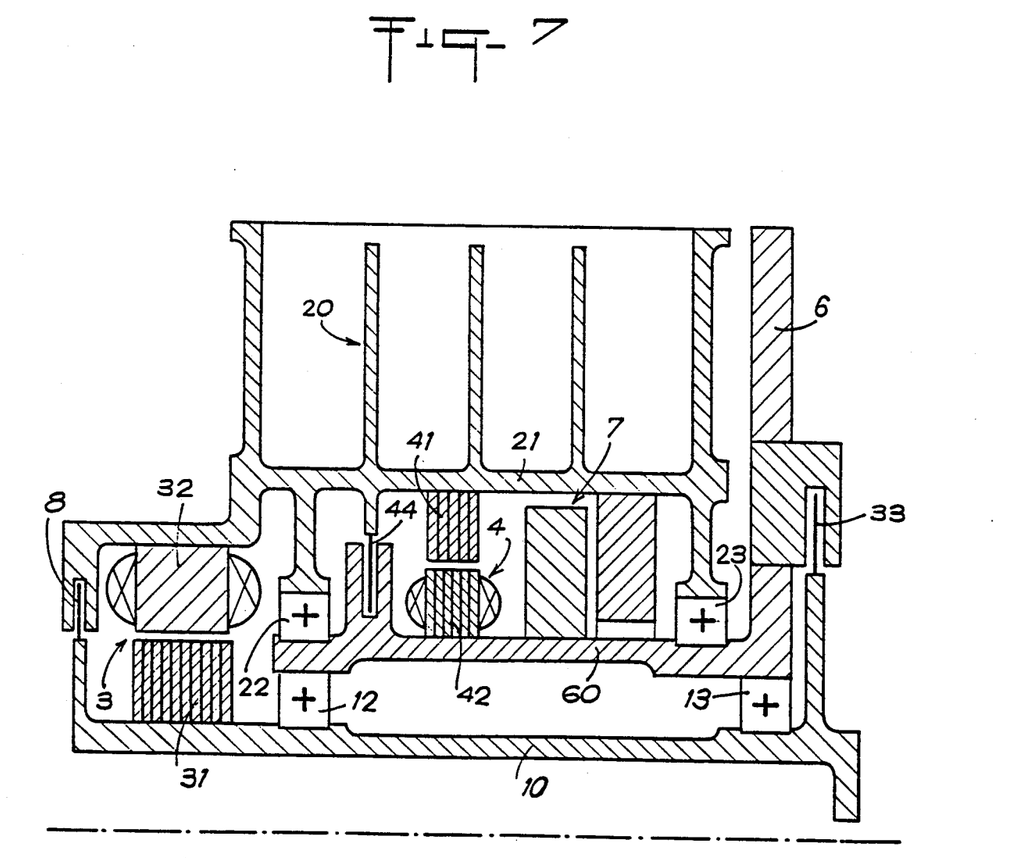
FIG. 7 is an axial half section through a particular example of the stabilization system as shown in FIG. 2, having concentric nested rotors and a main motor whose wound pole pieces are fixed to the reaction rotor.

FIGS. 2 and 7 show embodiments in which the main motor 3 is powered by a rotary transformer 7 or by a rotary current collector.

In such cases, the maximum positive or negative angles through which the working rotor 10 and the reaction rotor 11 can rotate are practically unlimited and may comprise a large number of rotations.

This makes it possible, for example, to take account of cases where the working rotor 10 reaches considerable amplitudes on either side of a mean value of zero, or arbitrary amplitudes on either side of a non-zero mean value, said amplitudes being a function of the mission to be performed by the working inertia of the working member 1 which is fixed to the working rotor 10.

The embodiments of FIGS. 2 and 7 are equally applicable to cases where the working rotor 10 operates through small amplitudes about a zero mean value with the moment of inertia JA of the reaction rotor 21 being substantially smaller than the moment of inertia JU of the working rotor 10, thereby requiring the reaction rotor 21 to rotate through large amplitudes that may reach a large number of rotations.

Figure 3:
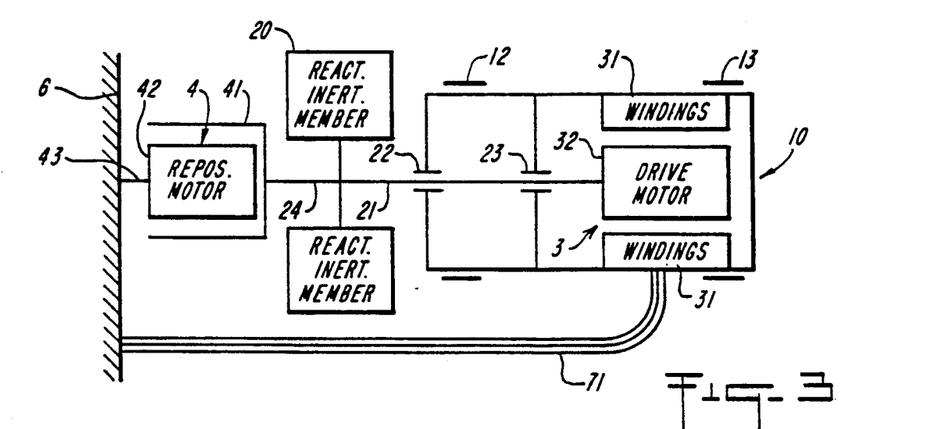
FIG. 3 is similar to FIG. 1, showing the main electric motor being powered by a spiral-wound coil of wires.
Figure 5:
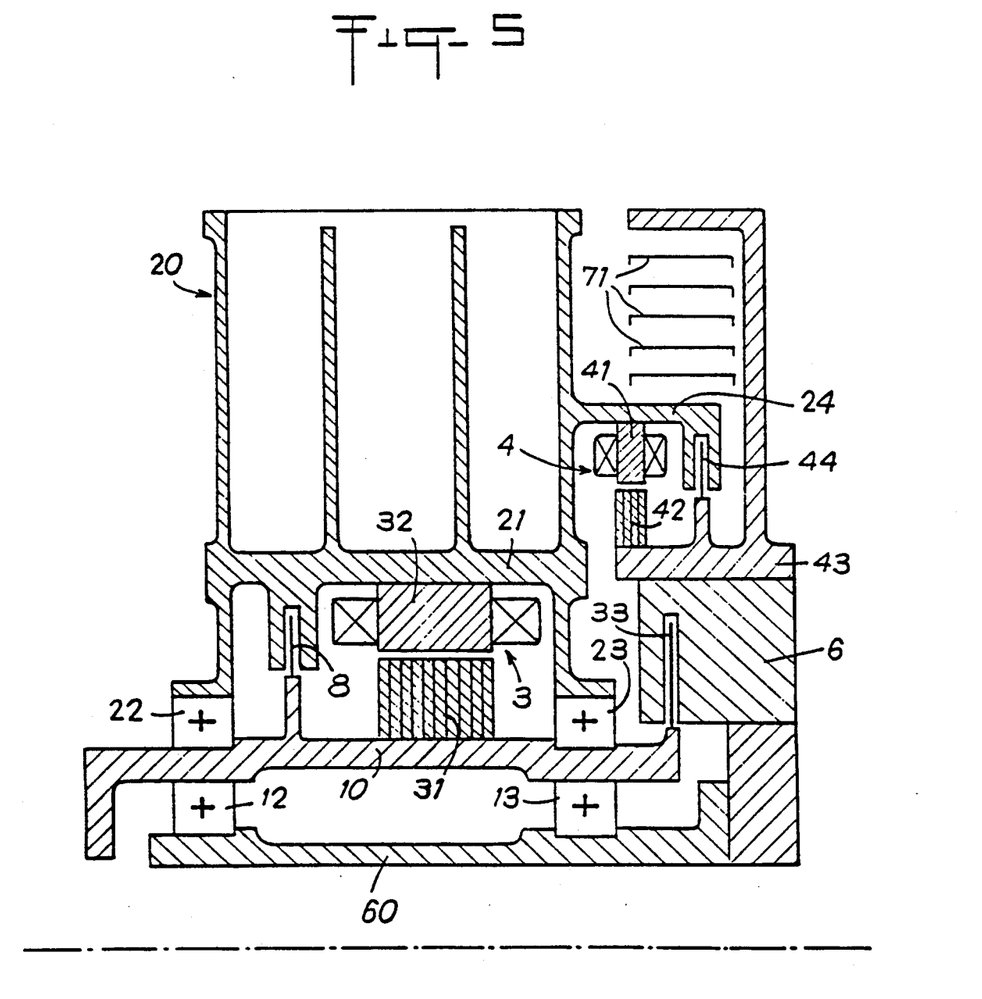
FIG. 5 is an axial half section view through a particular example of the stabilization system shown in FIG. 3 having concentric nested rotors and electric motors whose wound pole pieces are fixed to the reaction rotor.
Figure 6:
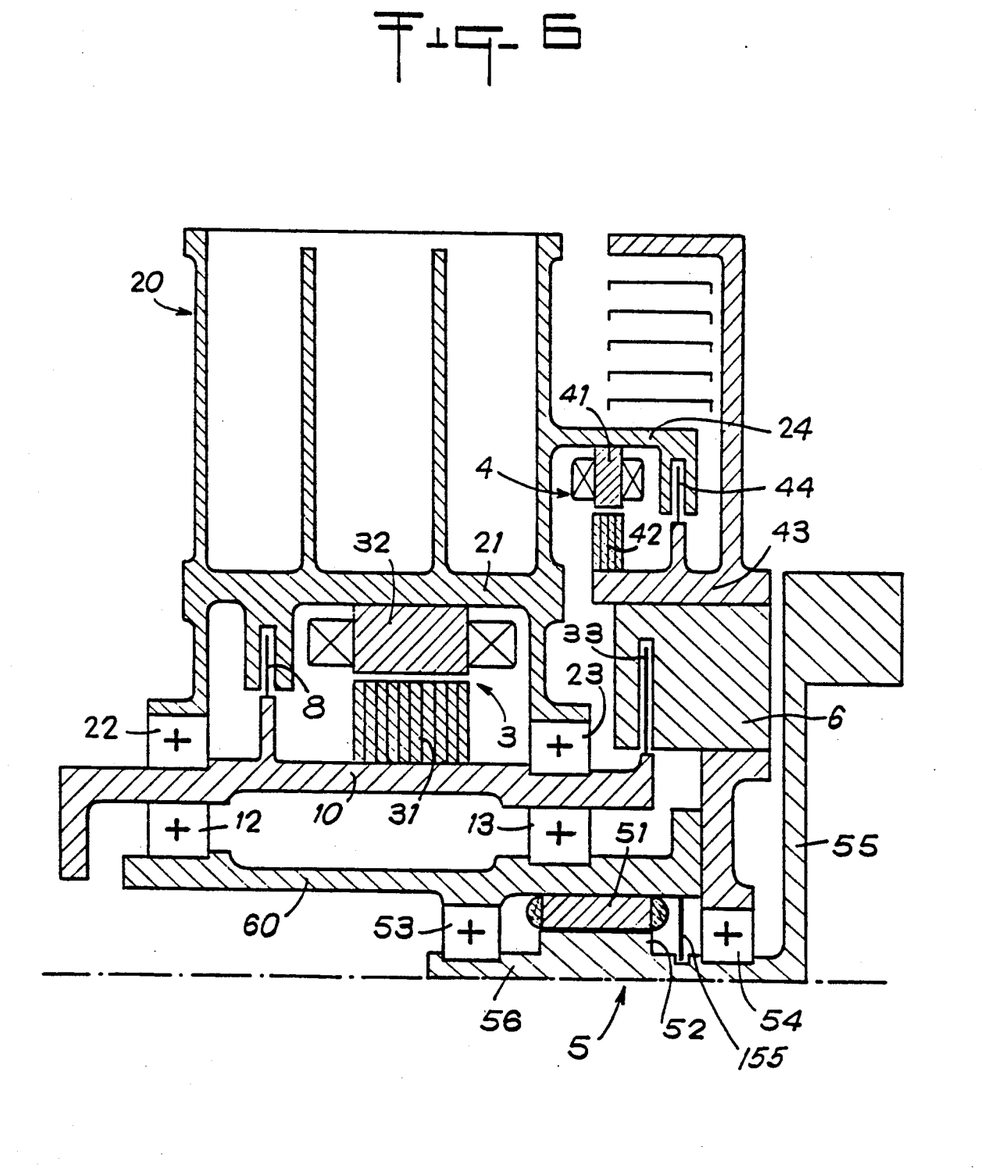
FIG. 6 is an axial half section through a particular example of a stabilization such as that shown in FIG. 4 with concentric nested rotors and three electric motors, the main motor acting on the working rotor and on the first reaction rotor, and the repositioning motor having wound pole pieces SO fixed to the first reaction rotor.

In contrast, FIGS. 3, 5, and 6 show embodiments in which the windings of the main motor 3 fixed to the working rotor 10 (FIG. 3) or the reaction rotor 21 (FIGS. 5 and 6) are powered by a spiral-wound coil of wires 71 enabling the corresponding rotor (working rotor 10 in FIG. 3 or reaction rotor 21 in FIGS. 5 and 6) to rotate through several rotations.

Thus, FIG. 3 corresponds to a case where the amplitude of angular motion for the working rotor 10 is limited and remains between values $-\theta U$ and $+\theta U$ which may nevertheless be equal to several rotations. In this case, the drive motor 3 common to the working rotor 10 and the reaction rotor 21 has winding-free pole pieces 32 fixed to the reaction rotor 21 and wound pole pieces 31 fixed to the working rotor 10. The windings of these pole pieces 31 are powered by a coil of wires 71 wound in a spiral and allowing the working rotor 10 to rotate at any moment and without restriction through an amplitude lying within the range of values $-\theta U$ to $+\theta U$.

FIG. 5 corresponds to the case where the mean speed of the working rotor 10 is zero, and where the amplitude of rotation of the working rotor 10 about its mean position is limited in value but may be as many several rotations. In this case, the amplitude of rotation of the reaction rotor 21 is likewise determined to remain between values $-\theta A$ and $+\theta A$ which may nevertheless be equal to several rotations. The limit values $-\theta A$ and $+\theta A$ are determined by giving the moment of inertia JA of the reaction rotor 21 an appropriate value taking account of the maximum amplitude of rotation of the working rotor, of the moment of inertia of the working rotor 10, and of the predetermined motion law to be applied to said working rotor 10. In this case, the drive motor 3 common to the working rotor 10 and to the reaction rotor 21 has winding-free pole pieces 31 fixed to the working rotor 10 and wound pole pieces 32 fixed to the reaction rotor 21. The windings of these pole pieces 32 are powered by a spiral-wound coil of wires enabling the reaction rotor 21 to rotate at any moment and without restriction through an amplitude lying in the range of values extending from $-\theta A$ to $+\theta A$.

In the various embodiments described, it is preferable for the mass of the reaction inertia member 20 which constitutes the major portion of the inertia associated with the reaction rotor 21 to be constituted by working elements that perform technical functions, for example these working elements may be the servo-control circuits for the main motor 3 and for the repositioning motor 4.

The stabilization system of the invention may have various configurations. Thus, the main motor 3 may be mounted on portions of the working rotor 10 and of the reaction rotor 21 which are cantilevered out from the bearings 12, 13 and 22, 23 respectively (FIGS. 1, 2, 4, and 7), or else they may be disposed on the rotors 10 and 21 in a central position between the bearings 12, 13 and 22, 23 (FIGS. 5 and 6). The motor 3 may also be mounted, for example, cantilevered out on the reaction rotor 21 relative to the bearings 22 and 23 while being situated between the bearings 12, 13 on the working rotor 10 (FIG. 3).

The embodiments of FIGS. 5 to 7 show a working rotor 10 and a reaction rotor 21 which are concentric with each other and relative to an internal support portion 60 in the form of a cylinder serving to define a compact structure enabling the bearings 22, 23 supporting the reaction rotor 21 to be disposed relative to the working rotor 10 in the same radial planes as the planes containing the bearings 12, 13 which support the working rotor 10 relative to the base support structure 6.

In the embodiments shown in FIGS. 5 and 6, the main motor 3 is mounted in the central portion of the concentric portions of the rotors 10 and 21 situated between the bearings 12, 22 and 13, 23, whereas the repositioning motor 4 and its associated detector 44 are disposed between a cylindrical portion 24 cantilevered out from the reaction rotor 21 and facing a cylindrical portion 43 of the support 6 which is coaxial with the cylindrical central portion 60. The wound pole pieces 41 of the repositioning motor 4 may be mounted, for example, on the portion 24 of the reaction rotor 21 if the corresponding servo-control circuits are disposed in the reaction inertia member 20, with the non-wound pole pieces being mounted on the cylindrical portion 43 of the support 6.

The repositioning motor 4 may be organized differently Thus, in FIG. 7 the main motor 3 is cantilevered out relative to the concentric rotors 10 and 21, and it is the repositioning motor 4 and its associated detector 44 which are situated together with the rotary transformer 7 directly between the main cylindrical portion 60 of the support and the reaction rotor 21 between the bearings 22 and 23. In this case, and by way of example, the repositioning motor 4 then has its wound pole pieces 42 fixed to the cylindrical portion of the support and its winding-free pole pieces 41 fixed to the reaction rotor 21.

A preferred embodiment of the mechanical stabilization system with counter-rotating nested rotors in which the working rotor 10 has a non-zero mean speed, is described below with reference to FIGS. 4 and 6. The stabilization system of FIGS. 4 and 6 includes a large number of items which are common with the embodiments of FIGS. 1 and 5, in particular a main motor 3 interposed between a working rotor 10 and a reaction rotor 21 which are concentric, and a repositioning motor 4, e.g. a stepper motor, interposed between the support 6 and the reaction rotor 21 in order to position the reaction rotor 21 in such a manner as to counteract the effects of drift due to friction, synchronously with the main motor 3.

However, in this case, the main motor 3 does not serve to cancel the angular momentum of the assembly. The ratio of the moments of inertia JA and JU of the reaction rotor 21 and of the working rotor 10 is designed to enable the reaction rotor 21 to oscillate through a plurality of rotations compatible with powering the motors and the detectors by means of coiled wires.

Figure 4:
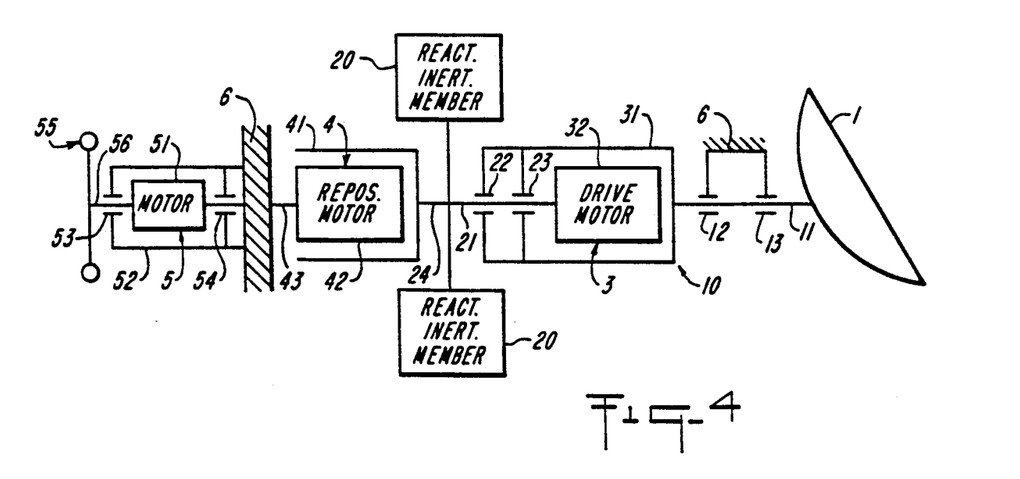
FIG. 4 is similar to FIG. 1, showing an embodiment having a second reaction rotor driven by a third electric motor.

In the embodiments of FIGS. 4 and 6, a second reaction rotor 56 carrying a second reaction member 55 and mounted on the support to be stabilized 6 via bearings 53 and 54 serves to cancel angular momentum during rotation of the working rotor 10 and at the average speed thereof. In this embodiment, the function of cancelling the angular momentum of the entire system requires a third electric motor 5 to be installed between the second reaction rotor 56 and the support 6 in order to drive the second reaction rotor 56 in the opposite direction to the working rotor 10, with the speed of rotation and the inertia of the second reaction rotor being such that the angular momentum of the second rotor is equal in magnitude and opposite in sign to the angular momentum of the working rotor 10 rotating at its average speed. The main motor 3 situated between the working rotor 10 and the first reaction rotor 21 then serves merely to cancel residual variation in the angular momentum of the working rotor 10.

The third electric motor 5 has wound pole pieces 51 fixed to the second reaction rotor 56 and is constituted by a motor which is servo-controlled by its own detector 155 and synchronously with the other servo-control circuits.

In the embodiment of FIG. 6, the second reaction rotor 56 is mounted on ball bearings 53 and 54 so as to be concentric with the cylindrical portion 60 of the support 6, inside said cylindrical portion and in the vicinity of one end of the working rotor 10 and of the first reaction rotor 21 in a radial plane corresponding substantially to that of the small repositioning motor 4. The second reaction rotor 56 is thus concentric with the working rotor 10 and with the first reaction rotor 21 and is nested therein, at least in part, in order to reduce bulk.

However, the second reaction rotor 56 may be separately mounted on the support 6 having its axis of rotation in alignment with the axes of rotation of the working rotor 10 and of the first reaction rotor 21.

The second reaction rotor 56, its electric motor 5, and the associated servo-control circuit may be adapted to compensate not only the angular momentum corresponding to the working rotor 10 rotating at its mean speed, but also variations in the angular momentum of the working rotor 10 associated with large speed excursions of said working rotor on either side of its mean value, such that the first reaction rotor 21 is only required to compensate small residual variations in the angular momentum of the working rotor 10.

In particular, the second reaction rotor 56 may provide a stabilizing function when the working rotor 10 is made to rotate for the first time, or during other operating conditions that are likely to give rise to major disturbances on the support.

By having a second reaction rotor 56 and a third electric motor 5, it is possible to reduce the weight of the servo-control circuits and the power supplies, thereby reducing the overall mass of the system, even though the system now includes additional items.

I claim:

1. A mechanical stabilization system with counter-rotating nested rotors, the system comprising:
a support to be stabilized;
a working rotor mounted on the support by means of bearings and fixed to a working member for which at least one parameter defining the rotation of the working rotor is variable as a function of time;
a reaction rotor concentric with the working rotor, mounted on the working rotor by means of bearings and fixed to a reaction inertia member;
a first electric motor interposed between the working rotor and the reaction rotor and rotating the working rotor and the reaction rotor in opposite directions; and
a low power second electric motor interposed between the reaction rotor and the support, wherein the system further comprises,
a detector interposed between the working rotor and the support in order to measure said parameter defining the rotation of the working rotor and on which a predetermined law of motion as a function of time is imposed;
a first servo-control circuit receiving signals from the first detector in order to modify the operating characteristics of the first motor so as to cause said predetermined law of motion to be complied with;
a second detector interposed between the reaction rotor and the support;
a second servo-control circuit synchronous with the first servo-control circuit and receiving signals from the second detector in order to servo-control the low power second electric motor in order to reposition the reaction rotor and correct drift arising in the correcting motion of the reaction rotor in particular due to friction in the bearings; and wherein
an amplitude of rotation of the working rotor about its mean position is greater than several rotations.

2. A system according to claim 1, in which the working rotor has a means speed of rotation substantially equal to zero and an amplitude of rotation limited to a predetermined value $\theta U$ on either side of its mean position, wherein one reaction rotor has a moment of inertia UA determined as a function of; said predetermined value $\theta U$; a moment of inertia JU of the working rotor; and
said predetermined motion law imposed on the working rotor, thereby maintaining said amplitude of rotation of the reaction rotor to a limited value $\theta A$ equal to several rotations,
wherein the first drive motor common to the working rotor and to the reaction rotor includes winding-free pole pieces fixed to the working rotor and wound pole pieces fixed to the reaction rotor, and
wherein the wound pole pieces are powered by a spiral-wound coil of wires enabling the reaction rotor to rotate through an amplitude greater than said limited value $\theta A$ for the amplitude of rotation of the reaction rotor.

3. A system according to claim 1, in which the amplitude of rotation of the working rotor remains within a range of values limited to several rotations, wherein the first drive motor common to the working rotor and to the reaction rotor includes winding-free pole pieces fixed to the reaction rotor and wound pole pieces fixed to the working rotor, and wherein the wound pole pieces are powered by a spiral-wound coil of wires enabling the working rotor to rotate through an amplitude greater than said limited value $\theta U$ for the amplitude of rotation of the working rotor.

4. A system according to claim 1, in which the amplitude of rotation of the working rotor or of the reaction rotor is not limited, the system being wherein the first drive motor common to the working rotor and the reaction rotor is powered by a rotary transformer or by a rotary current collector disposed between the working rotor and the support.

5. A system according to claim 1, in which the working rotor has a non-zero mean speed of rotation, wherein the system further comprises a second reaction rotor rotating in the opposite direction to the working rotor, a third motor being interposed between the support and the second reactor rotor in order to drive the second reaction rotor, and a third servo-control circuit synchronous with the first and second servo-control circuits in order to control the third motor on the basis of a third detector disposed between the second reaction rotor and the support so as to rotate the second reaction rotor at a speed and an inertia such that its angular momentum JB is equal in magnitude and opposite in sign to the angular momentum of the working rotor rotating at its mean speed of rotation, such that the first reaction rotor is required to compensate residual variations only in the angular momentum of the working rotor.

6. A system according to claim 5, wherein the third servo-control circuit controls the third electric motor to cause the second reaction rotor to compensate for the angular momentum as well as, variations in the angular momentum thereof resulting from large excursions in speed of rotation of the working rotor on either side of its mean value, thereby enabling the first reaction rotor to compensate small residual variations only in the angular momentum of the working rotor.

7. A system according to claim 1, wherein the reaction inertia member representing the major portion of the inertia of the reaction rotor comprises, working elements including at least one of said first and second electronic servo-control circuit.

8. A system according to claim 1, further comprising a differential detector interposed between the working rotor and the first reaction rotor in order to provide control signals to the first and second servo-control circuits.

9. A system according to claim 5, wherein the second reaction rotor is concentric with the working rotor and with the first reaction rotor, and is at least partially bound within said working rotor and said first reaction rotor.

10. A system according to claim 5, wherein the second reaction rotor is separately mounted on the support and has its axis of rotation in alignment with the axes of rotation of the working rotor and of the first reaction rotor.

11. A system according to claim 1, wherein the support is a spacecraft, and the working member mounted on the working rotor is a rotary member comprising an antenna.

* * * * *

UNITED STATES PATENT AND TRADEMARK OFFICE
CERTIFICATE OF CORRECTION

PATENT NO. : 5,012,170
DATED : April 30, 1991
INVENTOR(S) : Gérard Atlas

It is certified that error appears in the above-identified patent and that said Letters Patent is hereby corrected as shown below:

Column 4, line 41. "wound pole pieces SO fixed" should read -- wound pole pieces are fixed --.

Column 7, line 44, "differently Thus," should read -- differently. Thus--;

Column 9, lines 42&43, "working rotor has a means speed" should read --working rotor has a mean speed--;

Column 9, line 46, "UA determined as a function of;" should read --JA determined as a function of--;

Column 10, line 36, "angular momentum as well as," should read --angular momentum resulting from the mean speed of rotation of the working rotor, as well as,--.

Signed and Sealed this

Seventeenth Day of August, 1993

Attest:

BRUCE LEHMAN

*Attesting Officer*  *Commissioner of Patents and Trademarks*